March 30, 1926.
F. M. CASE
AUTOMATIC FISHING REEL
Filed June 23, 1924
1,579,191
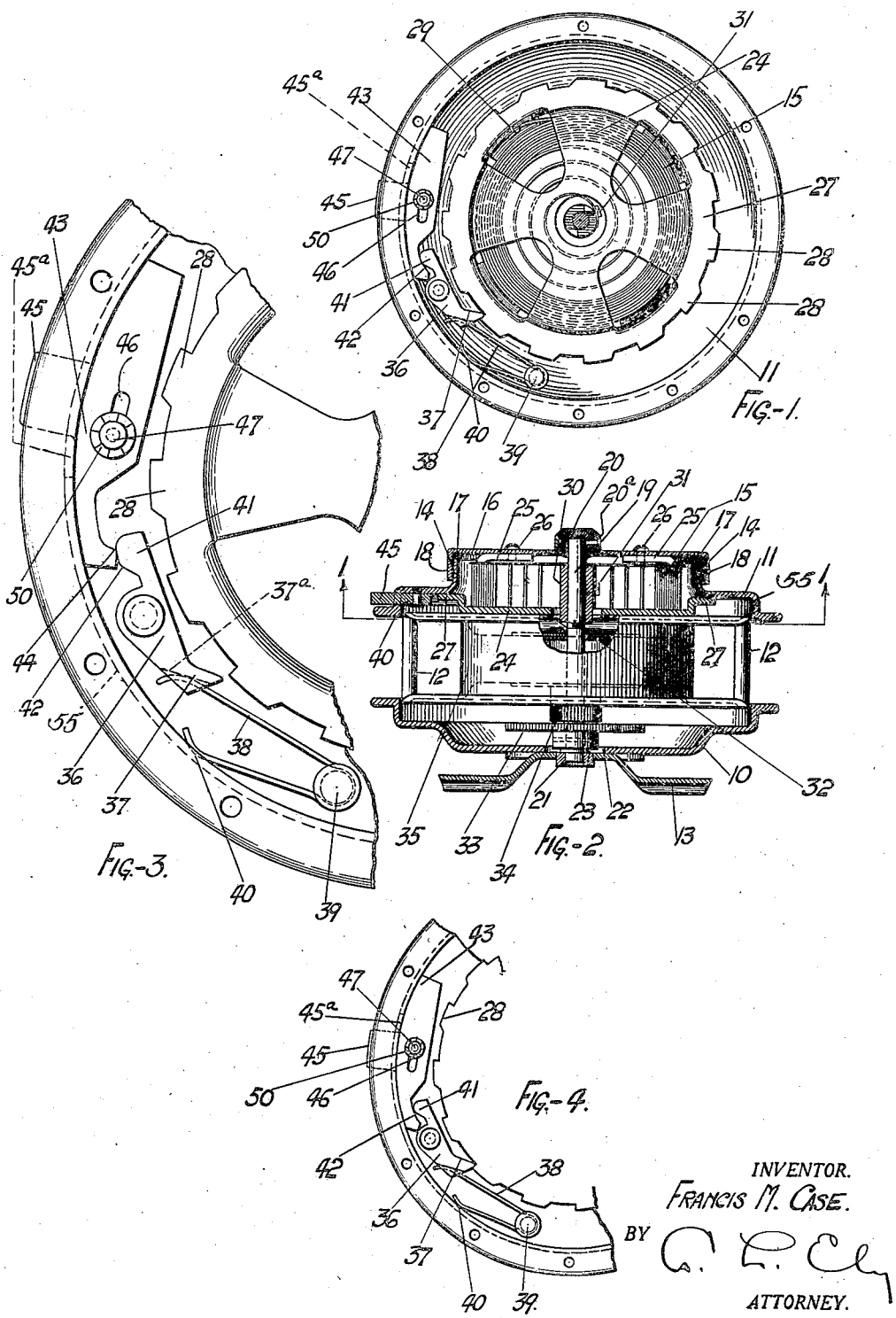
INVENTOR.
FRANCIS M. CASE.
BY
ATTORNEY.

Patented Mar. 30, 1926.

1,579,191

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

AUTOMATIC FISHING REEL.

Application filed June 23, 1924. Serial No. 721,624.

*To all whom it may concern:*

Be it known that I, FRANCIS M. CASE, a citizen of the United States, and a resident of Cleveland, county of Cuyahoga, State of Ohio, have invented certain new and useful Improvements in Automatic Fishing Reels, of which the following is a specification.

This invention relates to fishing reels and particularly to fishing reels of the automatic type which employ a coil spring for rotating the spool.

The purpose of the present invention is to provide means for releasing the main spring and particularly to provide an improved spring control device which includes a pawl normally held in engagement with a ratchet on the spring drum and which may be held in an inoperative position with respect to the ratchet to permit the rotation of the spool free from the action of the spring.

The above and other purposes will become apparent when the following detailed description is read in connection with the accompanying drawings, it being understood that the invention is not limited to the particular embodiment thereof shown and described.

Of the accompanying drawings:—

Figure 1 is a section on line 1—1 of Figure 2, illustrating the invention in its preferred form;

Figure 2 is a diametrical section of a fishing reel in which the invention may be utilized;

Figure 3 is a detail of the preferred form of the invention as illustrated in Figure 1, but showing the parts in a spring release position; and Figure 4 is a similar detail, reduced in size, showing the pawl in a released position.

Referring to the drawings, 10 represents a back plate, 11 a front plate and 12, 12 pillars by which the plates 10 and 11 are connected together to form the reel cage. The plate 10 has a bracket 13 secured thereon by which the cage can be supported on a rod. The front plate 11 has a circular recess therein defined by a circumferential flange 14 adapted to form a housing for a coil spring 15. A rotatable cap plate 16 is seated on the edge of the flange 14, the cap plate having a wear washer 17 therein adapted to ride on the edge of the flange. The cap plate is formed with a circumferential flange 18 arranged to encircle the flange 14 and roughened or knurled on its outer surface to facilitate rotation of the cap plate. The cap plate is journaled on one end of a shaft 19 by a bearing 20 which may be provided with an oiling device shown at 20$^a$, the other end of the shaft 19 being journaled in a bearing 21 in the bracket 13, the shaft extending through an aperture 22 in the back-plate 10 and having a collar 23 secured to its lower end.

The spring 15 is housed in a drum 24 having lugs or ears 25, 25 struck up therefrom which project over the spring and have threaded apertures therein by which they are secured to the cap plate 16 by screws 26, 26 extending through apertures in the cap plate. The drum 24 has thereon a flange 27 formed with ratchet teeth 28, 28 and has one end of the spring 15 connected thereto as shown at 29. The other end of the spring is connected to a sleeve 30, as indicated at 31, the sleeve 30 being journaled on the shaft 19 and being formed with ratchet teeth adapted to interlock with a transverse pin secured to the shaft 19, as indicated at 32, imparting rotation to the shaft when the spring is unwinding.

The shaft 19 has a gear 33 secured thereon adapted to mesh with multiplying gearing (not shown) on the back plate, the latter in turn meshing with a gear 34 journaled on shaft 19 and secured to a spool 35 also journaled on the shaft 19. The gearing may be of any suitable arrangement whereby rotation of shaft 19 by spring 15 will be multiplied and transmitted to the spool 35.

The preferred embodiment of the present invention will now be described. A pawl 36 is pivoted on the inner surface of the front plate 11 so as to be adapted to engage the teeth 28 of ratchet 27. The pawl 36 is formed with a tongue 37 in the back of which is cut a slot 37$^a$ in which is seated one curved end of a spring 38 formed of a strip of resilient metal or wire looped about a post 39 and having its other end, also curved, in engagement with a recess 40 in the wall 55 about the plate 11. The spring 38 tends to maintain the tongue 37 in engagement with the ratchet 27.

It is frequently desirable to release the main spring so that the spool may run freely. To this end the pawl 36 is formed with an arm 41 having a cam surface 42. Arranged for co-operation with the cam surface 42 is a sliding latch 43 having cam surface 44 adapted to fit against the cam surface 42. The outer face of the latch fits against the inner face of the wall 55 and is guided thereby. The cam plate is formed with a lug 45 extending out of the reel through an elongated slot 45ª cut through the plate 11, by which lug 45 the plate 43 is adapted to be manually operated. The latch 43 is formed with a slot 46 through which extends a pin or stud 47 adapted slidably to retain the latch on the plate 11. A spring washer 50 may be located between the head of the stud 47 and the plate 43 to frictionally maintain the plate in its adjusted position.

It is desirable that the pawl be securely held in either of its positions and for this purpose the two cam surfaces 42 and 44 have been provided so that the pawl and cam will remain in the positions to which they are moved. In use, assuming the parts to be in the position shown in Figures 1 and 4, should it be desired to release the spring, the lug 45 is drawn backwardly until the tongue formed by the cam 44 lies over the tail of the pawl as shown in Figure 3. In either position the pawl is securely locked and cannot be accidentally moved. This is an improvement over previous constructions as will be appreciated by those skilled in the art.

The arrangement permits of the use of a hardened steel pawl 36 located entirely within the casing of the reel and protected from water.

Modifications of the invention may be resorted to without departing from the spirit or scope thereof as claimed in the appended claim.

What I claim is:

In an automatic fishing reel, a front plate having a flange, a spring located within the flange, a drum upon which the spring is mounted, a cap plate for winding the spring, a ratchet on the outer surface of the drum, a wall formed in the front plate and surrounding the ratchet, a pawl and a latch to operate said pawl lying within the space between the ratchet and the wall, the pawl being pivoted and having one end engaging the ratchet and the other end formed with a cam surface, the latch being curved along its outer edge to fit the wall, and having a cam surface adapted to cooperate with the cam surface on the pawl, the latch being mounted to move in an arc to actuate the pawl, and an integral projection upon the latch and passing through a slot in the wall by means of which projection the latch may be operated.

FRANCIS M. CASE.